Patented Jan. 9, 1923.

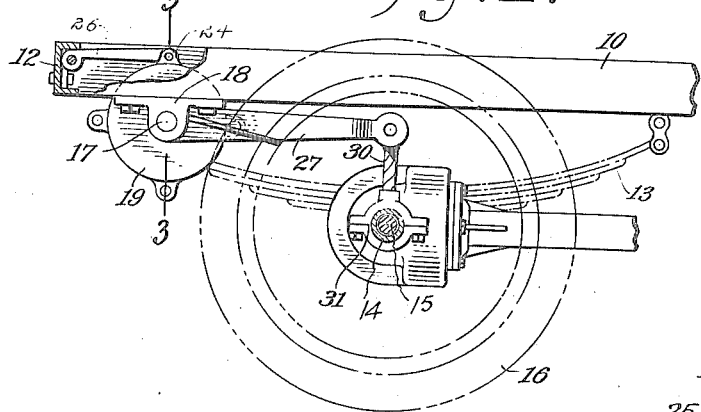
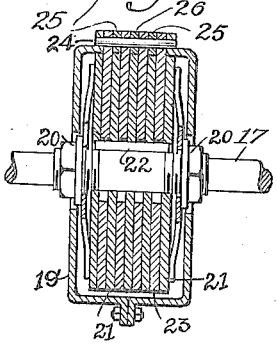
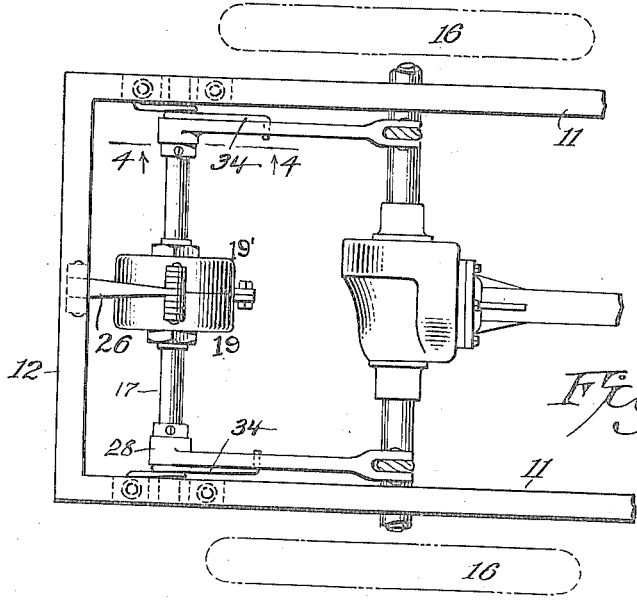
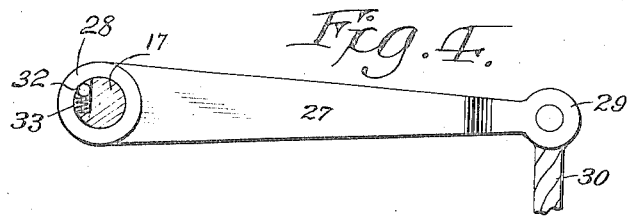

1,442,022

UNITED STATES PATENT OFFICE.

JAMES H. BROOKS, OF BRIDGEPORT, CONNECTICUT, ASSIGNOR OF ONE-HALF TO WILLIAM H. DOUGLAS, OF NEW YORK, N. Y.

SHOCK ABSORBER.

Application filed April 26, 1918. Serial No. 231,016.

*To all whom it may concern:*

Be it known that I, JAMES H. BROOKS, a citizen of the United States, residing at Bridgeport, county of Fairfield, State of Connecticut, have invented certain new and useful Improvements in Shock Absorbers, of which the following is a specification.

The invention relates to an 'improved form of shock absorber of general application and specifically relates to an anti-rebound device for use in connection with automobiles and other vehicles where it is desired to absorb the sudden shock and minimize the resulting strain coming upon the vehicle body supporting springs and upon the body during that movement in which the body and axle tend to separate beyond their normal relative position.

It has been proposed to mount at each side of the vehicle, an anti-rebound device which comprised in each case, a small rotary two element friction brake and a one-way clutching engagement between the movable element of the brake and the adjacent spring. This type of device possessed limitations which prevented it from becoming a commercial success.

If both sides of the vehicle rebounded simultaneously and with equal force the necessary resistant force could be distributed between the two devices and each would need be of a size and intensity of frictional engagement merely sufficient to take care of the rebound. However, this condition seldom exists and it is usual for one side of the body to rebound forcefully while the other side is at or substantially adjacent its normal position. In order to take care of the usual rebound of the body adjacent each ground engaging wheel, it has been necessary to design the anti-rebound devices at each side of the body of a size and with a resistance torque sufficient to cushion the action on each side. This results in the use of two powerful and cumbersome devices to each axle. Further space limitation at the sides rendered this attempted solution entirely abortive, especially where attempts were made to position the device between the parts of the elliptical springs.

Accordingly, the primary object of the invention is to provide a simplified form of shock absorber employing but one frictional braking device so associated with the floating axle that it can automatically exert its entire resistant torque either to cushion the simultaneous rebound of both sides of the body in a proportion dependent directly upon the forces of the rebounding action at each side or, selectively to exert its entire torque in resisting the rebound at either side when the opposite side of the axle remains at its normal position.

The invention further contemplates a construction which can be readily mounted on conventional forms of vehicle structures without disarranging or interfering with the operation of existing parts and which can be disposed in an available space in one type of vehicle.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:

Figure 1 is a fragmentary vertical sectional view of the rear portion of a vehicle body with a preferred embodiment of the invention shown in position thereon and taken longitudinally of the body;

Figure 2 is a plan view of the construction shown in Figure 1;

Figure 3 is a sectional view axially through the frictional brake and taken on the line 3—3 of Figure 1; and Figure 4 is a similar view of one of the clutches and taken on the line 4—4 of Figure 2 looking in the direction indicated by the arrow.

There is shown a vehicle underframe 10 symbolically representing the body of a motor driven vehicle and including oppposite disposed side sills 11 and a connecting rear sill 12. The underframe is resiliently supported by means of springs 13 from the dead axle 14. This axle encloses the live axle 15 which drives the ground engaging wheels 16 all as is usual in well known forms of automobile constructions.

The device forming the subject-matter of this invention constitutes an attachment designed to be readily mounted on the conventional vehicle construction. It includes a shaft 17 mounted in brackets 18 fastened to the underside of the side sills 11 adjacent the rear sill 12. The shaft parallels the axles, is spaced a material distance therefrom and is free to rotate in its bearings 18.

A frictional braking device 19 is mounted centrally on the shaft and includes a plurality of disks (see Fig. 3) in frictional engagement. The disks are demountably held in position by nut locking devices 20 threaded to the shaft at opposite ends of the braking device. The alternate and end disks 21 are fastened to the shaft by means of a key 22. The other disks 23 each have an extension projecting from their upper edges and are fastened together by means of a pin 24 passed through the extensions and through separating washers 25 disposed between adjacent pairs of the extensions. The disks so pinned together are held against rotation by means of a link 26, one end of which is pinned to the center of the rear sill 12 and the other end of which replaces the center washer 25. By this construction one set of the disks is fixed to the body while the coacting set is fixed to the shaft. Any desired resistance torque may be provided either by tightening or loosening the nut locking devices 20, by adding or subtracting the number of pairs of disks, or by utilizing both means of adjustment. The disks and spring locking devices are enclosed in a casing 19'.

A pair of one-way clutching devices connect the wheels at opposite ends of the axle with the shaft 17 and are operatively independent of each other. These devices each include a relatively long arm 27 having a hub portion 28 with a long bearing on the shaft and with its free end bifurcated as shown at 29 and positioned over the portion of the axle adjacent the contiguous wheel. The free end of the arm is linked to the portion of the axle therebetween by means of a strap 30. The upper end of the strap is pivoted to the arm between the bifurcations and the lower end is made of two parts constituting a yoke 31 encircling the dead axle as shown in Figure 1. By this form of connection it is possible to secure the attachment to the axle and to remove the same for repair or replacement without demounting any of the structural parts of the vehicle.

The portions of the shaft surrounded by the hub portions 28 are cut away to provide angled recesses 32 in which are mounted rollers 33.

These recesses with their coacting rollers each constitute a one-way clutch which permits free relative rotary movement between the shaft 17 and hub 28 when the underframe is moving towards the axle but which promptly forms a secure clutching connection between the shaft and hub as the body begins to move in the opposite direction. The arms 27 are held normally in raised position by springs 34.

In operation and assuming that one or both of the springs have been flattened by the movement of the vehicle body towards the axle, it will be apparent that during this movement the frictional braking device will be inoperative and the hub 28 will merely rotate idly about the shaft without clutching the same. However, on the re-bound of the underframe, under the reactory force of the springs, one or both of the clutches provided by the recesses 32 and rollers 33 will cause a prompt clutching of one or both of the arms 27 with the shaft 17. This will promptly bring the frictional braking device into play and the upward movement of the underframe will be resisted by the retarded movement of the friction disks 21 sliding about the disks 23. Let it be assumed for illustration that the resistant torque of the frictional brake disclosed is 100 pounds, then when both springs are reacting equally, each spring is resisted by approximately 50 pounds torque. Again, assume that only one side of the underframe is raising under the action of its spring and that the other spring is substantially stationary and adjacent its normal position. In this case the entire resistant force of the 100 pounds is exerted to resist the movement of the single rebounding spring. In other words, a single powerful friction braking device may be utilized for three purposes to resist either of the springs or both of the springs. The entire resistance force of the brake may be distributed proportionately to either side of the underframe to compensate for the tendency of the spring on the depressed side to move said side past its normal position on the rebound or may be utilized solely to resist the spring on either side.

By means of a device of this character the frictional clutch is removed from the side of the vehicle and may be positioned in the available space at the center of the rear portion of the underframe. The strains are equally distributed about the entire rear portion of the underframe and not localized at any one place thus permitting the utilization of a powerful and even large frictional brake on conventional automobile constructions.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a vehicle, the combination with a pair of oppositely disposed ground engaging wheels, and a resiliently supported vehicle body, of a shaft mounted on the vehicle body for rotary movement and with opposite ends positioned adjacent the wheels, braking means acting on the shaft and tending to resist the rotary movement thereof, and a pair of one-way clutch members connected to the shaft, positioned on opposite sides of said braking means and each operatively connected respectively near its adjacent wheel whereby relative movement of both wheels and the body portion in one direction will be resisted by said braking means or the relative movement of either one of the wheels and the body portion in one direction will be resisted by the same braking means.

2. In a vehicle, the combination with a floating axle and a vehicle body, of a device for resisting relative movement in one direction between the axle and vehicle body, said device including a shaft carried by the vehicle and paralleling the axle, braking means acting on the shaft to resist the rotary movement thereof and a pair of spaced apart one way clutch members adapted to engage the shaft to rotate the same against the action of said braking means, said one-way clutch members connected to the axle adjacent opposite ends thereof whereby relative movement between the vehicle and either end of the axle may be resisted by the total retarding force of said braking means.

3. In a device of the class described, the combination with a floating axle and a resiliently supported vehicle body, of a single frictional resistance means for opposing relative movement in one direction between the axle and body and connections between said resistance means and the portions of the axle adjacent opposite ends thereof, said connections being normally inoperative and each adapted to become operative when the portion of the axle engaged thereby moves relative to the body in the said direction.

4. In a device of the class described, the combination with a floating axle and a resiliently supported vehicle body, of a shaft journalled in said body, a friction brake including a plurality of disks in frictional contact and supported on the shaft, means for holding alternate disks against rotation on the shaft, means for securing others of the disks to the shaft, a pair of arms mounted on the shaft on opposite sides of said brake and projecting over the axle, a one-way clutching mechanism between each of said arms and the shaft, and a pair of depending links connecting the arms with the portion of the axle therebelow.

5. In a device of the class described, the combination with a floating axle and a resiliently supported body including side sills, of an attachment comprising a shaft extending between and journalled in the sills for rotary movement, a frictional brake positioned between the side sills with certain elements thereof fixed to the shaft to rotate therewith and means for holding the coacting elements of the brake against rotation, a one-way clutch connected to the axle adjacent one end thereof and adapted to clutch the portion of the shaft between the brake and the adjacent side sill.

6. In a device of the class described, the combination with a floating axle and a resiliently supported body, of an attachment comprising a shaft mounted for rotary movement on the body, a frictional brake with certain elements thereof fixed to the shaft to rotate therewith and means for holding the coacting elements of the brake against rotation, a one-way clutch connected to the axle adjacent one end thereof and adapted to clutch the shaft, adjustable means for holding said elements against movement longitudinally of the shaft whereby the resistant torque of said friction brake may be varied.

7. In a device of the class described, the combination with a running gear including a pair of ground engaging wheels and a vehicle body supported from the running gear, a connection between the running gear and the vehicle body including a friction brake and a pair of clutching means for automatically connecting either or both wheels to the brake to resist relative movement in one direction between the body and either wheel.

8. In a vehicle, the combination with a body and an axle for carrying a ground engaging wheel, of a shaft having a fixed axis of rotation spaced from the axle and mounted on the body for rotary movement, a friction clutch including a plurality of disks encircling said shaft and having certain of said disks fixed to the shaft to rotate therewith and means connecting the coacting disks with the body to resist rotary movement of said coacting disks, and a one-way clutch connection between said shaft and said axle whereby relative movement between the body and axle in one vertical direction is substantially free of resistance from said clutch and the relative movement between the body and wheel in the opposite direction is resisted by the frictional engagement of the disks of the clutch, said clutch and brake being distinct parts independently demoutable from the shaft.

9. In a vehicle, the combination with a vehicle body having a side sill and vertically movable means for engaging one of the ground wheels of the vehicle, a bearing carried by said side sill, a shaft mounted for rotary movement in said bearing, a friction brake carried by said shaft having one of its friction elements keyed to the shaft to rotate therewith and a co-related friction element fixed to the body and held thereby against rotary movement on the shaft, a one-way prompt acting clutch mounted on said shaft to rotate the same in one direction and an arm having one end fixed to the clutch to rotate the same and having its opposite end fixed to said wheel engaging means to be moved vertically by the vertical movement of the ground wheel.

Signed at Bridgeport, in the county of Fairfield and State of Connecticut this tenth day of April, A. D., 1918.

JAMES H. BROOKS.